June 21, 1960 J. G. TRYON 2,942,193

REDUNDANT LOGIC CIRCUITRY

Filed July 30, 1958 3 Sheets-Sheet 1

INVENTOR
J. G. TRYON
BY Alan C. Rose
ATTORNEY

June 21, 1960 J. G. TRYON 2,942,193
REDUNDANT LOGIC CIRCUITRY
Filed July 30, 1958 3 Sheets-Sheet 2

INVENTOR
J. G. TRYON
BY Alan C. Rose
ATTORNEY

INVENTOR
J. G. TRYON
BY Alan C. Rose
ATTORNEY 2,942,193

REDUNDANT LOGIC CIRCUITRY

John G. Tryon, Chatham, N.J., assignor to Bell Telephone Laboratories, Incorporated, New York, N.Y., a corporation of New York Filed July 30, 1958, Ser. No. 752,143

10 Claims. (Cl. 328—92)

This invention relates to redundant digital data processing or logic circuits and more particularly to such circuits in which errors are corrected.

Many techniques have been proposed for coping with errors in logic systems. One well-known system involves the use of three circuits and a "majority vote" output circuit. Errors are then corrected on a two-out-of-three basis. However, from a systems design standpoint, two serious problems are presented. First, if the "majority vote" circuits are repeated frequently throughout the system, there would normally be no check on errors which may be introduced in the voting circuits. On the other hand, if three complete and independent circuits of significant size are employed with the voting circuit only at the output, there is considerable likelihood of errors occurring in two of the three circuits.

Accordingly, one object of the present invention is to correct errors in logic circuits near the point at which they occur.

A collateral object of the invention is to correct errors in binary logic circuits without the use of focal "vote-taking" circuits in which a transient error or component failure can produce an erroneous output signal.

In accordance with the present invention, it has been discovered that error correction may be provided in many logic circuits by quadruplicating or "quadding" the circuits, and by properly interconnecting successive levels of the logic circuits. Particularly in the case of successive levels of AND and OR circuits, it turns out that errors may be eliminated within two levels after they originate.

The required connections between successive levels of logic are quite simple, and require that the output from each of a set of four logic circuits on one level be connected to two different logic units in the next level. Transposition of the connection pattern is required in successive levels when there is a change, from AND or OR units, for example, between successive stages. The pattern of the connections is not changed, however, if two successive stages of either AND or OR circuits are employed. Certain other requirements of the connection patterns for particular cases of interest will be discussed below in the body of the description.

In accordance with a feature of the invention, successive levels of a logic circuit are provided in quadruplicate and the output of each logic circuit in one level is connected to the input of two logic circuits in the next level.

In accordance with another feature of the invention, logic circuits are provided in quadruplicate, and cross-connections are provided to merge vote-taking arrangements into the circuitry.

A more specific feature of the invention involves the use of patterns of cross-connections between successive levels of quadruplicated logic circuits which depend on the logic circuit changes between the successive levels. Changes between levels of logic include changes between AND circuits at one level and OR circuits in an adjacent level, and the inclusion of negation circuitry between levels. Negation circuits, in combination with an AND or an OR circuit, also constitute a logic circuit change. If there are an odd number of such logic circuit changes between a first and a second set of logic circuits, the pattern of connections to the second stage is from the pattern of connections at the input to the first stage of logic circuits. In the case of an even number of changes, including no changes, however, the pattern of input connections to the two stages remains unchanged.

A complete understanding of this invention and of these and various other features thereof may be gained from consideration of the following detailed description and the accompanying drawing, in which.

Figures 1, 2, 3:
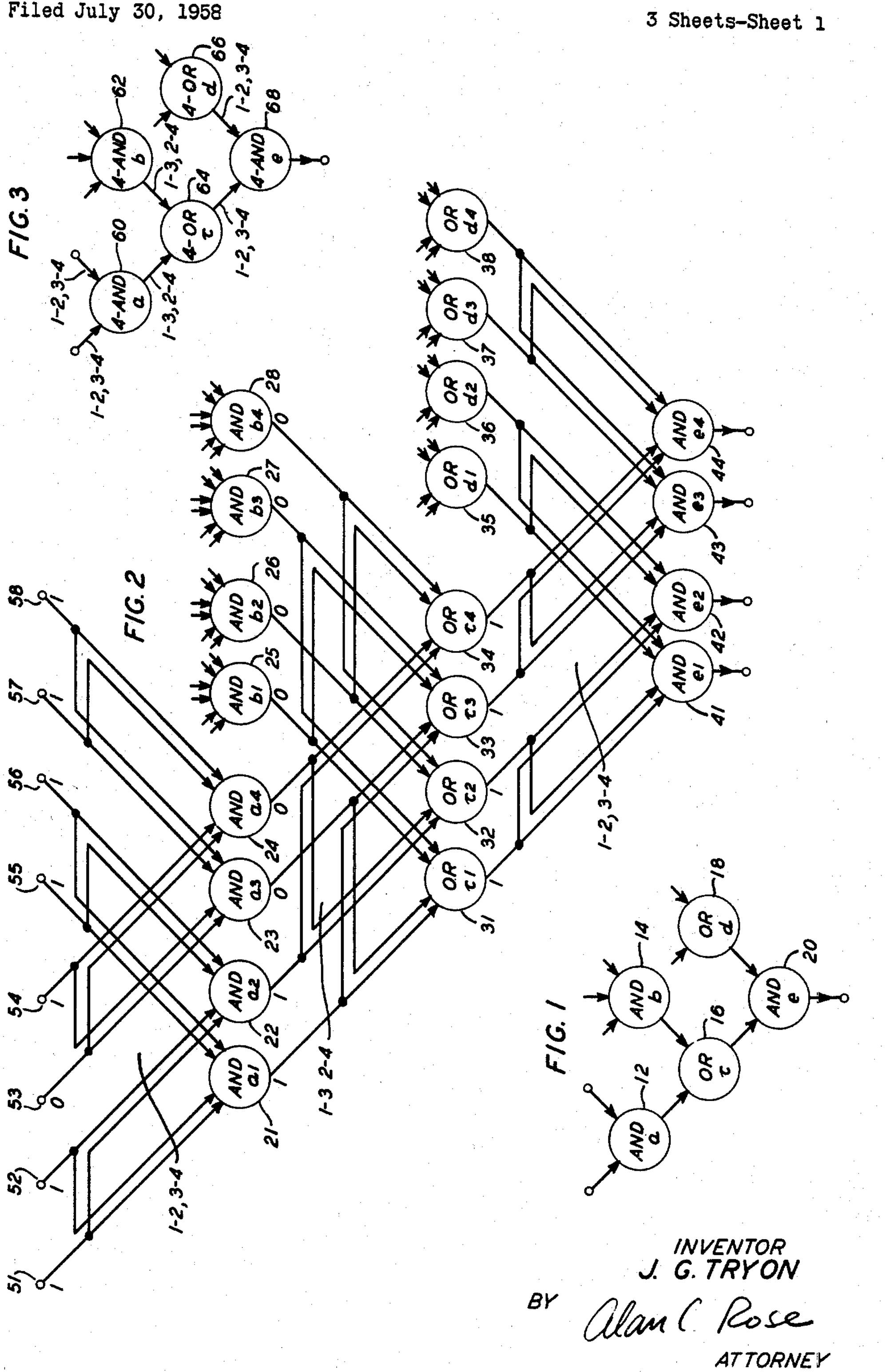
Fig. 1 is a conventional logic circuit employing AND gates and OR circuits.
Fig. 2 is a quadruplicated or "quadded" circuit in accordance with the invention which otherwise is the equivalent of the circuit of Fig. 1.
Fig. 3 is a circuit diagram representing the identical circuit of Fig. 2, but in a simpler form of notation.

With reference to Fig. 1, successive levels of AND and OR circuits are included in a conventional logic circuit. The first level includes the AND circuits 12 and 14, the second level includes the two OR circuits 16 and 18, and these two OR circuits are connected to an output AND gate 20.

The circuit of Fig. 2 is a quadruplicated version of the conventional circuit of Fig. 1. In place of the AND circuit 12 of Fig. 1, the four AND circuits 21 through 24 are provided. In a similar manner, the AND circuit 14 is replaced by the four AND circuits 25 through 28. The OR circuits 16 and 18 find their quadded counterparts in the OR circuits 31 through 34 and 35 through 38, respectively, in Fig. 2. The four output AND gates 41 through 44 correspond to the output AND gate 20 of Fig. 1. The input terminals to the AND gates 21 through 24 include a first set of terminals 51 through 54 and a second set of four input terminals 55 through 58. These terminals may, for example, be connected to the output terminals of additional sets of quadded logic circuits.

Concerning the connections from the input terminals 51 through 54 to the AND circuits 21 through 24, it may be noted that each input lead is connected to two of the logic circuits. Thus, for specific example, input terminal 51 is connected to AND circuits 21 and 22, and input terminal 52 is also connected to AND circuits 21 and 22. In a similar manner, input terminals 53 and 54 are both connected to both the AND circuits 23 and 24. This pattern of cross-connections is designated 1—2, 3—4. This designation will be employed in a simplified representation of quadded circuits which will be employed in many of the remaining figures of the drawing. Between the AND circuits 21 through 24 and the OR circuits 31 through 34 the pattern of circuit interconnections is changed. More specifically, the connections between the first and third AND circuits 21 and 23 are paired and connected to the first and third OR circuits 31 and 33 of the next level of logic. Similarly, the output leads from the AND circuits 22 and 24 are paired and connected to the inputs of the OR circuits 32 and 34. The pattern of circuit interconnections between AND circuits 21 through 24 and the OR circuits 31 through 34 is therefore designated 1—3, 2—4. Between the OR circuits 31 through 34 and the AND circuits 41 through 44, the pattern of interconnections reverts to the 1—2, 3—4 pattern which was noted above as occurring between the input terminals 51 through 54 and the AND circuits 21 through 24. One other circuit interconnection pattern which may be employed at this point in the circuit is the 1—4, 2—3 pattern.

In examining the circuit interconnections of Fig. 2, it may be noted that the levels of logic involved a reversal from AND circuits to OR circuits in successive stages. Similarly, the pattern of circuit interconnections changes from stage to stage. The nature of the required interconnections will be considered in greater detail below; however, it may be noted in passing that in the case of connections between the same type of logic circuit, the pattern of connections does not change in the manner shown in Fig. 2.

The circuit of Fig. 2 has the interesting property that errors introduced into the circuit are wiped out within a few logic circuit levels downstream from the point at which the error is introduced. In this regard, the error may be a transient addition or omission of a binary signal, or may result from a permanent circuit component failure. The effect of typical errors on the circuit of Fig. 2 will now be considered. It will be assumed, for example, that all of the input terminals 51 through 54 and 55 through 58 should have a binary "1" applied to them. However, it will be further assumed, for specific example, that the input terminal 53 is actually in the "0" state. At the output from the AND circuits 21 through 24, all of the circuits should have an output "1." However, because one input lead to each of the AND circuits 23 and 24 is in the "0" state, these output leads will be in the "0" state. Assuming that the output from each of the AND circuits 25 through 28 is a "0," the output from the OR circuits 31 through 34 should be a "1." In view of the 1—3, 2—4 interconnection pattern between AND circuits 21 through 24 and the OR circuits 31 through 34, a "1" will indeed be supplied to each of the OR circuits 31 through 34. The erroneous "0" signals at the outputs of AND circuits 23 and 24 have thus been wiped out within two levels of logic.

In a similar manner, it may readily be shown that other erroneous signals are promptly corrected within a few levels of logic downstream from the point at which the erroneous signal was introduced into the circuitry. From a system standpoint, therefore, a moderately high density of errors is permissible without adversely affecting the output signals from a quadded logic system. In addition, the body of the logic circuitry includes no point at which a single error can introduce output errors into all four parallel logic channels. This is in contrast to systems in which three parallel channels are funneled into a vote taker at successive points in the system, and the output from the vote taker is fed back into the three parallel channels. In the present system, the vote takers are diffused into and merged with the complete logic system. Focal points, or "Achilles' Heels," at which errors may be introduced into all of the parallel channels are therefore avoided.

From a mathematical standpoint, the mode of operation of the circuit of Fig. 2 and other quadded circuits to be disclosed below may be set forth mathematically by the following Boolean algebraic expression.

$$f(a, b, c, \ldots) \rightarrow f[(a_1+a_2)\cdot(a_3+a_4)\ (b_1+b_2)\cdot(b_3+b_4),\ (c_1+c_2)\cdot(c_3+c_4),\ \ldots]$$

where $a$, $b$, and $c$ are binary input functions, $f$ is an output function, and the $a_1$, $a_2$, . . . are redundant versions of $a$, et cetera.

*Note (1)*.—The value of $(a_1+a_2)\cdot(a_3+a_4)$, where $a_1=a_2=a_3=a_4$ in the normal situation, is independent of an error in any one of the four input values of $a$.

*Note (2)*.—In addition to the redundant expression $(a_1+a_2)\cdot(a_3+a_4)$, the following equivalent expressions are used:

$$(a_1+a_3)\cdot(a_2+a_4)$$
$$(a_1+a_4)\cdot(a_2+a_3)$$
$$a_1a_2+a_3a_4$$
$$a_1a_3+a_2a_4$$
$$a_1a_4+a_2a_3$$

Fig. 3 represents the same quadded logic circuit shown in Fig. 2. In Fig. 3, however, a more compact form of notation is employed. In this notation, a circle having the legend "4–AND" stands for four quadruplicated AND circuits. In a similar manner, a circle with the legend "4–OR" stands for a set of four OR circuits. In Fig. 3, the blocks designated 60 and 62 correspond to the four AND circuits 21 through 24 and 25 through 28, respectively, of Fig. 2. The "4–OR" circuits 64 and 66 of Fig. 3 correspond to the sets of OR circuits 31 through 34 and 35 through 38, respectively, of Fig. 2. Similarly, the output "4–AND" circuit 68 corresponds to the set of output AND circuits 41 through 44 in Fig. 2. The connections between the quadruplicate logic circuits shown in Fig. 3 are designated in the same manner as in Fig. 2. Thus, the connection between the logic blocks 60 and 64 in Fig. 3 is designated 1—3, 2—4. This corresponds to the interconnections and designation between the AND circuits 21 through 24 and the OR circuits 31 through 34 in Fig. 2. In the remainder of the figures of the drawing, the notation shown in Fig. 3 will be employed to represent the quadded circuits.

Figure 4:
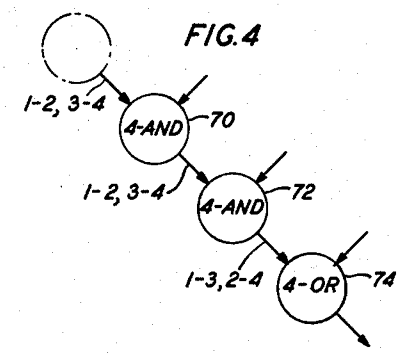
Figs. 4 and 5 are simple logic circuits which indicate the interconnection pattern for specific arrangements of quadded circuits.
Figure 5:
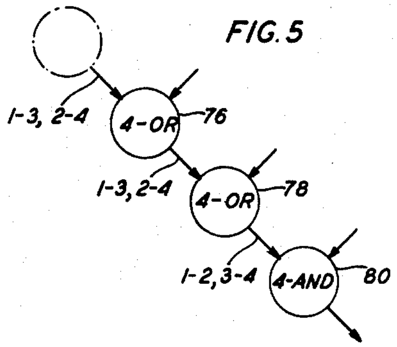

Figs. 4 and 5 are included merely to indicate the nature of circuit connections when successive levels of quadded logic include logic components which are alike. Under these circumstances, the circuit connections are unchanged between the like circuits. Thus, for example, in Fig. 4, the sets of quadded AND circuits 70 and 72 have identical input lead connections. Between the set of AND circuits 72 and the set of OR circuits 74, however, a reversal is introduced into the circuitry. In a similar manner, in Fig. 5 the two sets of OR circuits 76 and 78 have identical input circuit connections, whereas the connections to the AND circuit 80 are reversed as compared with the input connections to the OR circuit 78.

Figure 6:
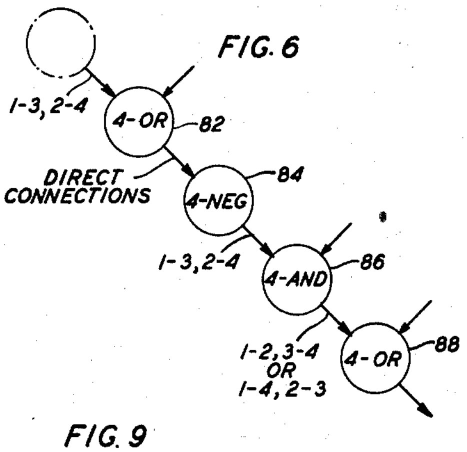
Figs. 6 and 7 are additional circuits in which the connection patterns in the vicinity of negation or inversion circuits are shown.
Figure 7:
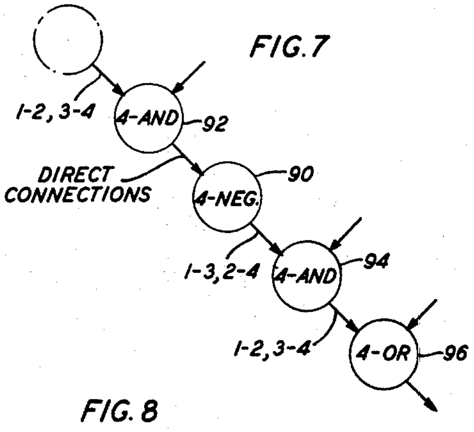

Figs. 6 and 7 illustrate the nature of the connections between quadruplicated levels of logic when negation or "NEGATE" circuits are employed. In binary logic circuits, a negation circuit changes the signal representing a binary "1" into that representing a binary "0," and vice versa. A brief statement of the effect of such circuits is that the presence of a set of four negation circuits between levels of logic causes a reversal of the connections which would otherwise be employed between logic circuit levels.

By way of example of these principles, Fig. 6 shows a set of OR circuits 82 followed by a set of four negation circuits 84, each of which is connected directly to only one of the OR circuits 82. Following the negation circuits 84, additional levels of logic include the AND circuits 86 and the OR circuits 88. In the absence of the negation circuits 84, a change in the pattern of interconnections would have been required between the OR circuits 82 and the AND circuits 86. With the negation circuits 84, however, the circuit interconnections between the negation circuits 84 and the AND circuits 86 are identical with the input connections to the OR circuits 82.

To contrast with the condition in which negation circuits appear between levels of OR and AND logic, the four OR circuits 88 are shown immediately following the four AND circuits 86. Under these circumstances, a change in the input wiring pattern is required. This change may be from the input pattern to the AND circuits 86 to either of the two alternative patterns as shown in Fig. 6. More specifically, with the input pattern of connections 1—3, 2—4 to the AND units 86, the circuit connections to the OR circuits 88 must take the form of 1—2, 3—4, or 1—4, 2—3.

In Fig. 7, an example is shown in which the negation circuits 90 are connected between two sets of AND circuits 92 and 94. In addition, a set of OR circuits 96 is connected downstream from the set of four AND gates 94. As noted in previous discussions, the presence of negation circuits between levels of logic changes the required pattern of interconnections. Thus, in connection with Figs. 4 and 5, we have noted that input connections to successive like sets of logic units are the same. With reference to Fig. 7, therefore, the introduction of the negation circuits 90 requires that the connections from these negation circuits to the following AND circuits be transposed. Thus, the input leads to the AND circuits 92 have the pattern 1—2, 3—4, and the input connections to the AND circuits 94 have the pattern 1—3, 2—4. In this regard, it may be noted that the alternative pattern 1—4, 2—3 could also be employed. With the change from AND circuits to OR circuits between the units 94 and 96 and no intermediate negation circuits, the input pattern of connnections to the OR units 96 must be different from that to the set of AND circuits 94. Accordingly, the pattern 1—2, 3—4 is employed as one of two possible permutations from the input pattern 1—3, 2—4 to the AND units 94.

In the foregoing description, AND, OR, and negation circuits have been considered to the exclusion of other logic circuits, such as inhibit circuits, for specific example. Attention has been directed primarily to AND, OR, and negation circuits because all logic functions may be realized with these components. Thus, for example, an inhibit circuit is merely an AND gate with a negation circuit connected to one input of the AND unit. The input lead to the negation circuit becomes the inhibiting input terminal to the inhibit unit. With the circuit reduced to the three components described above, the normal rules apply.

Concerning other possible variations, certain logic systems involve inversion or negation in combination with the AND or OR logic function. Typical of such systems is the direct coupled transistor logic circuitry disclosed by R. H. Beter et al. in an article entitled "Surface-Barrier Transistor Switching Circuits," which appeared at pages 147 through 160 of Part IV of the 1955 I.R.E. Convention Record. Circuits of this type are handled as indicated in Figs. 6 and 7. The sets of logic circuits including inversion or negation are connected into a larger system in the same manner as the combined sets of circuits 82 and 84 of Fig. 6, or the combined circuit blocks 90 and 92 of Fig. 7.

Figure 8:
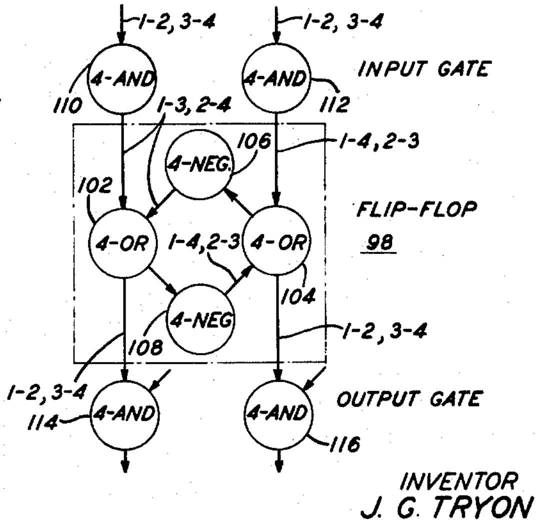
Fig. 8 shows the pattern of circuit interconnections for use with multivibrators or flip-flops.

Fig. 8 illustrates the application of the principles of the invention to a bistable multivibrator or flip-flop circuit. In accordance with a known representation for a multivibrator, the block 98 includes two OR circuits 102 and 104 and two negation circuits 106 and 108. The inputs to the multivibrator are provided from the set of AND circuits 110 and the additional set of AND circuits 112. With a binary "1" signal applied from the AND circuits 110 and a binary "0" signal applied from the AND circuits 112, the multivibrator circuits 98 soon assume a state in which the OR circuits 102 are in the "1" state and the OR circuits 104 are in the "0" state.

Output signals from the multivibrator 98 may be applied to the AND gates 114 and 116.

In order to satisfy the various conditions regarding input connection patterns discussed in detail above, a relatively complex pattern of connections is required in the vicinity of the multivibrator 98 of Fig. 8. Furthermore, all three possible connection patterns must be employed. Thus, for specific example, the input connections to the AND circuits 110, 112, 114, and 116 have the patterns 1—2, 3—4; the input connections to the OR circuits 102 have the pattern 1—3, 2—4; and the input connections to the OR circuits 104 have the pattern 1—4, 2—3. The principles under which all the foregoing examples of quadruplicated circuits are developed, and under which many more permissible configurations may be found, are as follows. Three patterns of cross-connections are available. The choice of pattern for the interconnection of two successive sets of AND or OR logic circuits depends on the number of changes in type of logic circuit between the sets. Changes include (1) the change from AND to OR, (2) the change from OR to AND, and (3) the inclusion of a NEGATE circuit in or between successive sets of logic circuits, where either or both sets may be AND or OR circuits.

The principle governing the choice of input connections to successive sets of logic circuits is as follows. If there are an odd number of such logic changes between a first and a second set of AND or OR logic circuits, the pattern of connections to the second stage must be different from the pattern of connections at the input to the first set. In the case of an even number of changes, including none, the pattern of input connections to the two groups must be the same.

In a system composed of AND, OR, and NEGATE units, any system wiring plan may be used which conforms everywhere to this rule. In systems employing more complex logic components, the proper system wiring plan may be devised by reducing the more complex logic components down to the corresponding AND, OR, and NEGATE circuits.

In the foregoing description, a number of the simpler logic circuits to which the principles of the present invention are particularly adapted have been considered. The adaptation of certain known control circuits so that they are compatible with the circuits described above will now be considered.

Figure 9:
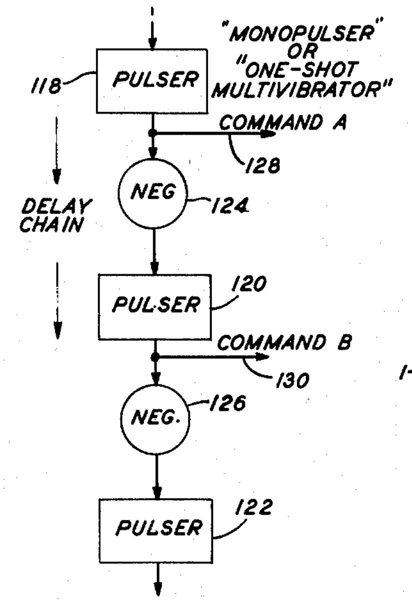
Fig. 9 is a conventional control circuit that is often employed in certain types of data processing systems.

Fig. 9 shows a delay chain of circuits for developing sequential binary signals or commands. The circuit of Fig. 9 includes the monopulsers or "one-shot" multivibrators 118, 120, and 122. In addition, the negation circuits 124 and 126 are included between each pair of pulser circuits. Following an input signal applied to the monopulser 118, a single pulse is applied on lead 128 and to the negation circuit 124. The application of a pulse from the negation circuit 124 to the second monopulser 120 produces an output pulse on lead 130. In addition, the pulse from circuit 120 is applied through negation circuit 126 to the next pulser 122 in the delay chain. Additional sequential commands may be developed by an extended series of additional circuits such as those shown in Fig. 9.

Figure 10:
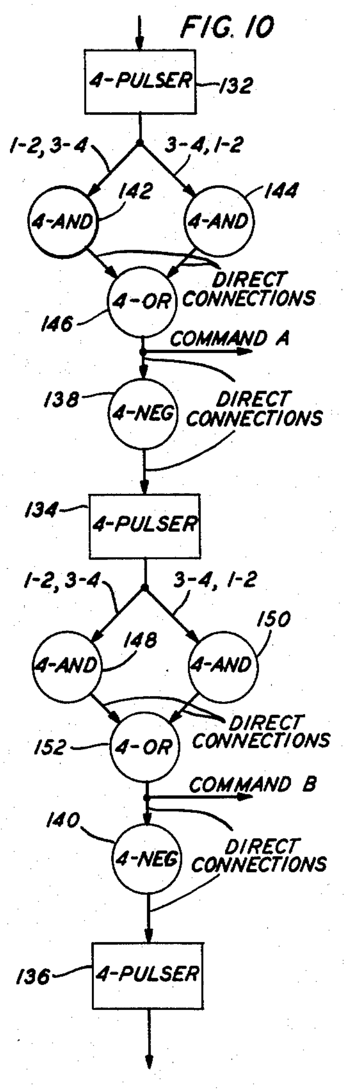
Fig. 10 is a redundant version of the circuit of Fig. 9 in accordance with the present invention.

Fig. 10 represents the quadruplicated version of the circuit of Fig. 9. The delay chain of Fig. 10 includes three sets of pulser circuits 132, 134, and 136. The two sets of negation circuits 138 and 140 corresponding to the negation circuits 124 and 126 of Fig. 9 are connected directly to the pulser circuits 134 and 136, respectively, of Fig. 10. Two sets of AND circuits 142 and 144 and a set of OR circuits 146 are required in the circuit of Fig. 10 for error correction purposes between the set of pulsers 132 and the negation circuits 138. A similar group of three sets of circuits 148, 150, and 152 are connected between the pulser circuit 134 and the negation circuit 140. A detailed explanation of the reasons for the inclusion of the three extra circuits in each place will not be undertaken. However, they are necessary in order to correct the various possible errors which may be introduced by the pulser circuits 132 and 134, for example. These errors may take the form of a continuous output of a monopulser, a momentary unwanted output from a monopulser, or a complete blocking of input signals, for example.

Figure 11:
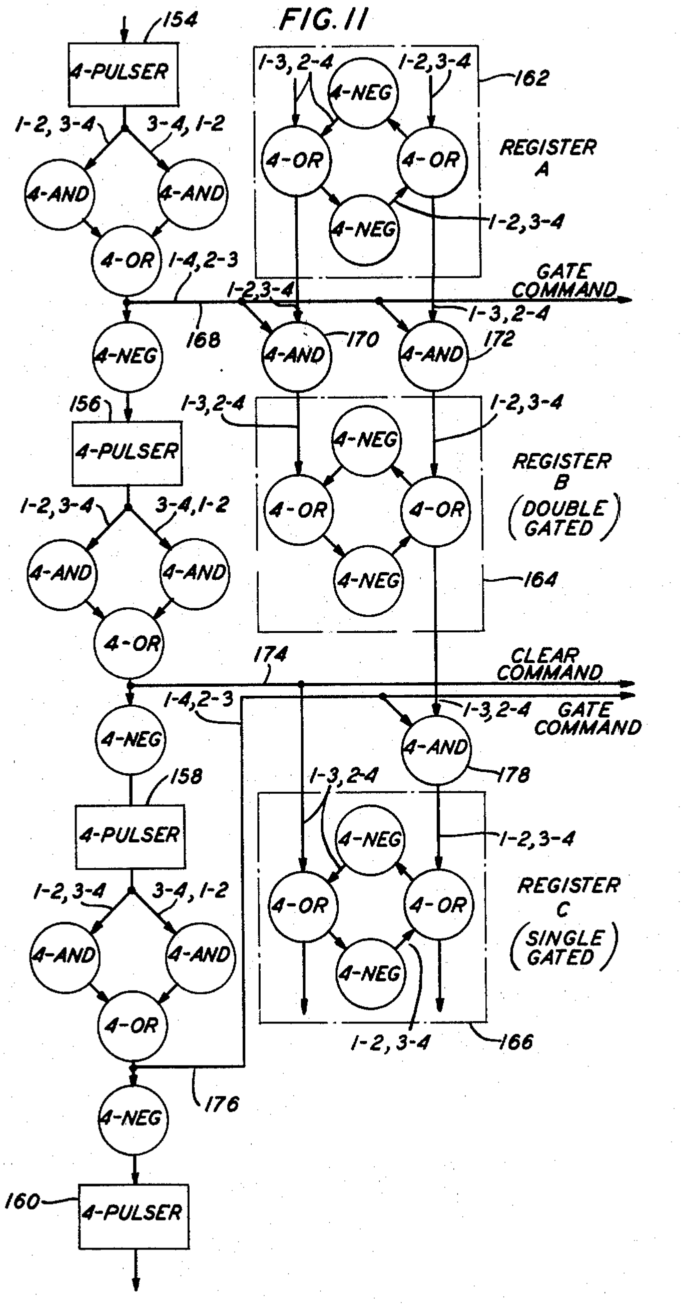
Fig. 11 is a redundant logic circuit showing a representative application of the quadded circuitry of the present invention.

Fig. 11 shows a delay chain for controlling gating between registers. Techniques for shifting information between registers on a "double-gated" and a "single-gated" basis are specifically disclosed in this figure.

In Fig. 11, the sets of monopulsers 154, 156, 158, and 160 correspond in their mode of operation to the pulsers included in the delay chain of Fig. 10. Furthermore, the logic circuit components included between successive pairs of the sets of monopulsers are identical with those shown in Fig. 10. Toward the right-hand side of Fig. 11, three sets of bistable multivibrators or flip-flops 162, 164, and 166 are shown. These multivibrators are representative of three parallel registers A, B, and C. They are operated in the manner described above for the multivibrator 98 of Fig. 8. When a control signal is applied on the gate command lead 168, the state of the multivibrators 162 is transferred to the set of multivibrators 164 through the two sets of AND gates 170 and 172. In the case of the single-gated multivibrator 166, an initial clear command is applied to the multivibrator from lead 174. Thereafter, a gate command on lead 176 enables the AND gate 178 to change the state of multivibrator 166 if it is not already in the same state as multivibrator 164.

The circuitry, as set forth in the foregoing description above, has the advantage that it will continue to provide correct output signals in spite of transient errors or component failures, provided only that these difficulties are not too closely spaced in time and location. With further replication beyond the quadruplication discussed above, a greater number of errors may be tolerated in any given level of the circuitry.

Concerning the implementation of the individual logic circuits shown in the drawing, many types of logic AND, OR and NEGATE circuits are well known in the art. Suitable circuits are disclosed, for example, in the R. H. Beter et al. article cited above, and in an article entitled "Regenerative Amplifier for Digital Computer Applications" by J. H. Felker, which appeared on pages 1584 through 1596 of the November 1952 issue of the Proceedings of the Institute of Radio Engineers (volume 40, No. 11).

It is to be understood that the above-described arrangements are illustrative of the application of the principles of the invention. Numerous other arrangements may be devised by those skilled in the art without departing from the spirit and scope of the invention.

What is claimed is:

1. In a redundant logic system, a plurality of groups of four identical logic circuits in each of several successive stages of said logic system, said logic circuits including AND circuits and OR circuits, and means for connecting the output from each of said logic circuits in each stage to the inputs of two of the four logic circuits in the next successive stage, the connection pattern between successive stages being different when said logic circuitry includes an odd number of logic circuit changes from stage to stage and being the same when there are an even number of changes from stage to stage.

2. In a self-correcting logic system, a plurality of successive levels of logic circuitry each including sets of quadded logic circuits, means for applying identical input signals to one of said sets of logic circuits, and means for connecting the output of each logic circuit in said one set to the inputs of two logic circuits in the next successive set of quadded logic circuits.

3. In combination, a plurality of stages of identical quadrauplicated logic circuits, and connections between each logic circuit in each stage and at least two logic circuits in the next successive stage.

4. In a redundant logic system, a plurality of groups of four identical logic circuits in successive stages of said logic system, each of said logic circuits in each stage having an output connected to the inputs of two of the four logic circuits in the next successive stage, the input connection pattern to the logic circuits in successive stages being different when said logic circuitry includes an odd number of logic circuit changes from stage to stage.

5. In a redundant logic system, a plurality of groups of four identical logic circuits in successive stages of said logic system, each of said logic circuits in each stage having an output connected to the inputs of two of the four logic circuits in the next successive stage, the connection pattern between successive stages being different when said logic circuitry includes an odd number of logic circuit changes from stage to stage and being the same when there are no changes or an even number of changes from stage to stage.

6. In combination, four AND circuits, means for supplying identical input signals to at least three of said four AND circuits, four OR circuits, and means for connecting output signals from each of said AND circuits to the inputs of two of said OR circuits.

7. In combination, four OR circuits, means for supplying identical input signals to at least three of said four OR circuits, four AND circuits, and means for connecting output signals from each of said OR circuits to the inputs of two of said AND circuits.

8. In combination, four input terminals, means for suplying identical binary input signals to at least three of said four input terminals, four AND circuits, means for connecting each of said four input terminals to the inputs of at least two of said AND circuits in accordance with a predetermined pattern, four OR circuits, and means for connecting output signals from each of said AND circuits to the inputs of two of said OR circuits in accordance with a different connection pattern.

9. In a redundant logic system, a plurality of sets of at least four identical logic circuits in several successive stages of said logic system, said logic circuits including AND circuits and OR circuits, and means for connecting the output from each logic circuit in one set to the inputs of two of the logic circuits of another set in the next successive stage, the connection pattern between successive stages being different when said logic circuitry includes an odd number of logic circuit changes from stage to stage and being the same when there are an even number of changes from stage to stage.

10. In a redundant logic system, a plurality of sets of four identical logic circuits in several successive stages of said logic system, said logic circuits including AND circuits and OR circuits, and means for connecting the output from each logic circuit in one set to the inputs of two of the four logic circuits of another set in the next successive stage, the connection pattern between successive stages being different when said logic circuitry includes an odd number of logic circuit changes from stage to stage and being the same when there are an even number of changes from stage to stage, each of said connection patterns including connections from the output of each logic circuit of one pair in a first set of logic circuits to the inputs of both of two logic circuits in a second set in the next successive stage and connections from the output of each circuit of the other pair in said first set of four logic circuits to the inputs of both of the other two logic circuits of said second set.

References Cited in the file of this patent

"Arithmetic Operations in Digital Computers," by R. K. Richards, published by D. Van Nostrand Company Inc., copyrighted in 1955.